July 30, 1957  J. W. MAYER  2,800,835
LIGHTWEIGHT ROCKET LAUNCHER
Filed Oct. 29, 1952  3 Sheets-Sheet 1

Inventor
James W. Mayer

By H. E. Thibodeau & A. W. Dew
Attorneys

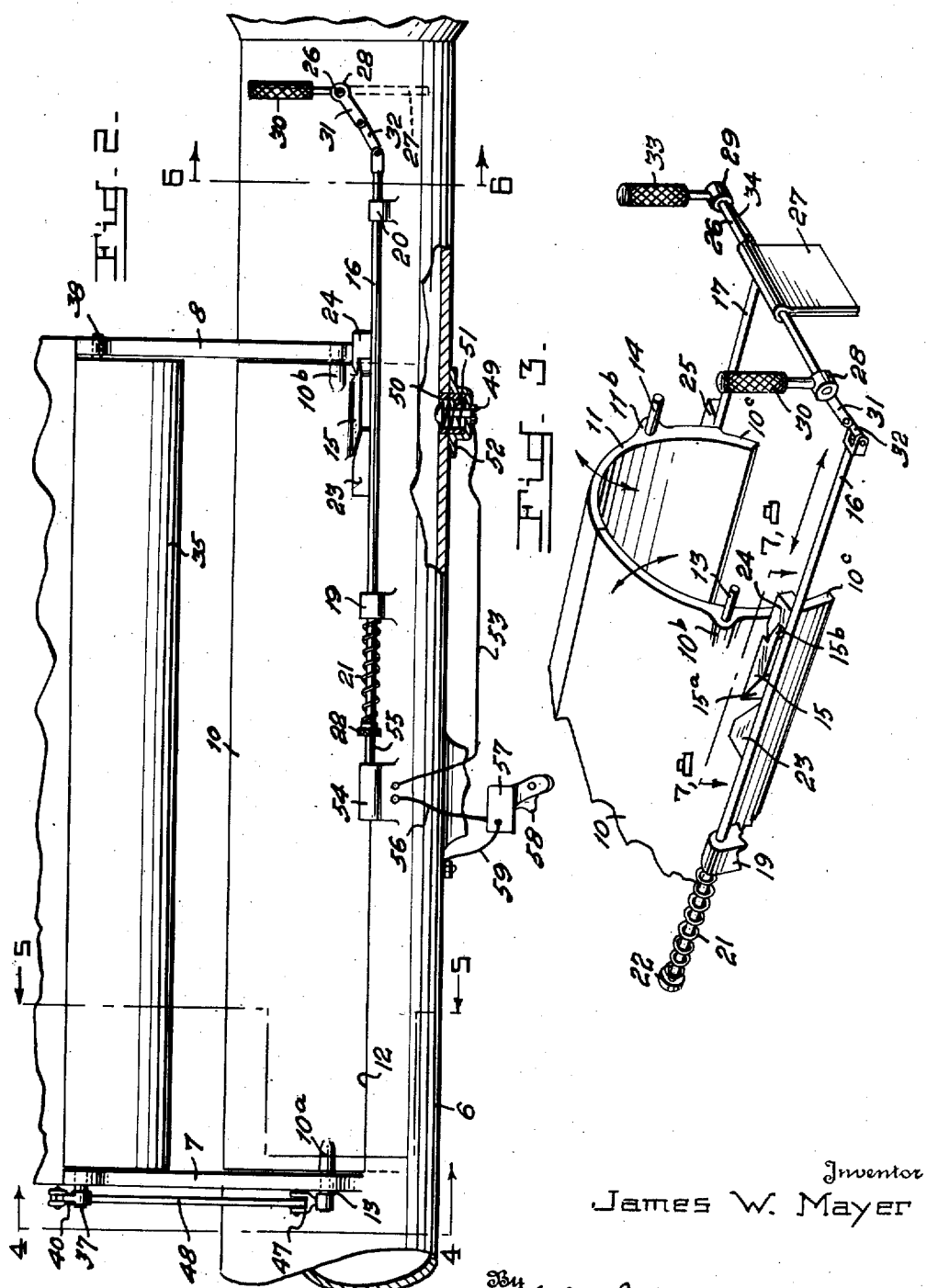

July 30, 1957  J. W. MAYER  2,800,835
LIGHTWEIGHT ROCKET LAUNCHER
Filed Oct. 29, 1952  3 Sheets-Sheet 3
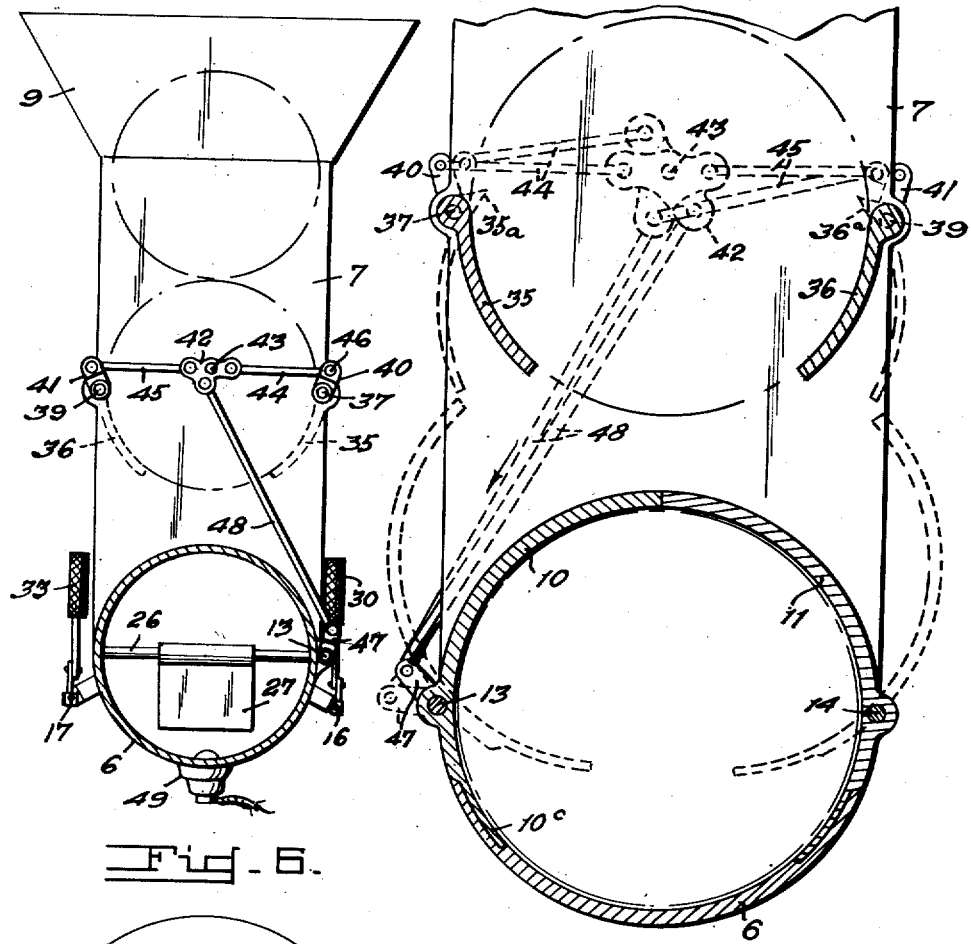
Inventor
James W. Mayer
By H. E. Thibodeau & A. W. Dew
Attorneys

United States Patent Office 2,800,835
Patented July 30, 1957

2,800,835

LIGHTWEIGHT ROCKET LAUNCHER

James W. Mayer, Evanston, Ill., assignor to the United States of America as represented by the Secretary of the Army Application October 29, 1952, Serial No. 317,610

9 Claims. (Cl. 89—1.7)

(Granted under Title 35, U. S. Code (1952), sec. 266)

The invention described herein may be manufactured and used by or for the Government for governmental purposes without the payment to me of any royalty thereon.

This invention relates to repeating rocket launchers, particularly of the automatic or semi-automatic type wherein the blast from propelling gases of one rocket actuates mechanism to automatically effect loading, from a magazine, of the succeeding rocket.

It is the principal object of the invention to provide a launcher of the aforesaid type which is light in weight for the caliber of rocket to be launched, simple in construction, and reliable in operation. By reason of these features and advantages, the launcher is particularly well adapted for use by airborne, reconnoitering, advancing forces or in any tactical situation where a versatile light-weight repeating launcher is needed.

A further object is the provision of a side-loading repeating rocket launcher which can be fired rapidly, but only when a rocket has been loaded into proper firing position and the loading doors closed.

A still further object is to provide a launcher of the type aforesaid wherein the indexing of a rocket from a magazine into the tube is effected by the blast of the propelling charge of a rocket being launched which blast also effects opening of the loading doors. Numerous other ancillary objects will be obvious to those skilled in the art after a study of the following description in connection with the drawing.

In the drawing:

Fig. 2 is a side elevation to an enlarged scale and partly in section of the launcher showing more particularly the blast-operated release rod.

Fig. 3 is a detail view showing in perspective the blast vane and door-operating mechanism actuated thereby.

Fig. 4 is a section in a plane identified by line 4—4 of Fig. 2 and showing the launcher tube doors closed.

Fig. 5 is a section taken in a plane identified by line 5—5 of Fig. 2 and showing to an enlarged scale, the same position of the doors as in Fig. 4 and in dotted lines, the position of the doors and index mechanism in loading position.

Fig. 6 is a section taken in a transverse plane identified by line 6—6, Fig. 2, showing the blast vane mounting and manually operated means therefor.

Figure 1:
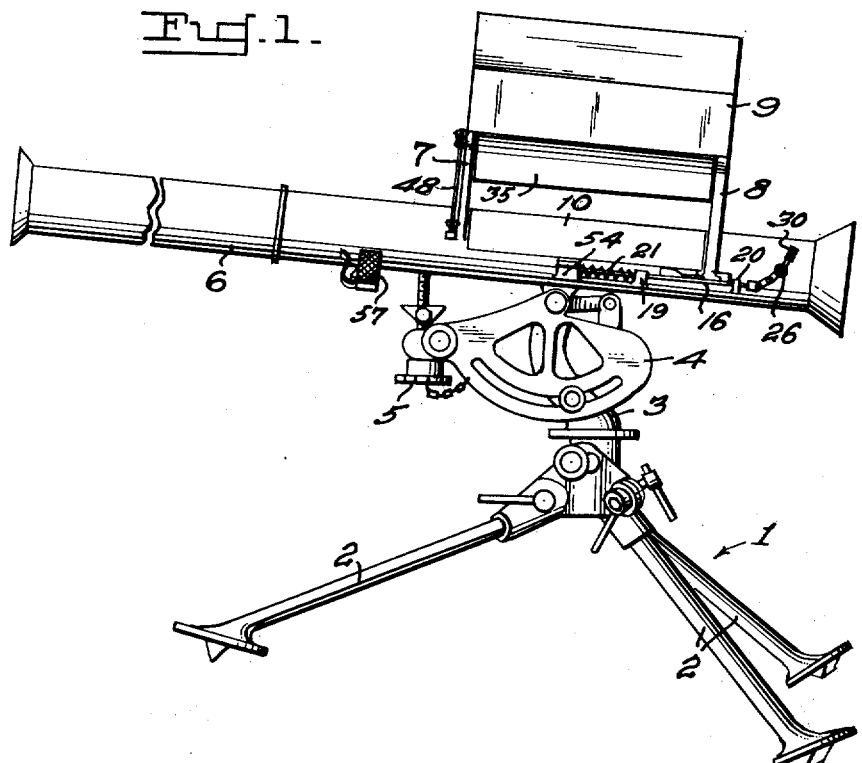
Fig. 1 is a left side elevation of the launcher forming the subject of this invention, mounted upon a light tripod.

Referring in detail to the drawing, and particularly to Fig. 1, the numeral 1 identifies generally a standard tripod, such as the .30 caliber machine gun mount having detachable legs 2, traversing head 3 carring elevation sector 4 mounting launcher tube 6 for 3.5" rockets, for example. Mechanism 5 of well-known construction provides for fine adjustment of the tube in elevation.

Tube 6 has a pair of standards 7 and 8 secured to its breech end and axially spaced by a distance sufficient to accommodate the downward passage of a rocket therebetween from magazine to tube. A magazine 9 generally trapezoidal in vertical transverse section is supported by the upper ends of these standards. While shown as open at its top to facilitate the easy and rapid loading of rockets thereinto, it will be understood that a hinged or removable cover therefor may be provided if desired, to prevent the ingress of rain, dust, etc. It is also contemplated that this magazine may be detachably secured in position upon the standards so that complete magazines each loaded with a predetermined number of rockets, may be rapidly positioned upon the standards in substitution for a preceding magazine whose rockets have been fired.

A pair of gates or doors 10 and 11 shaped as clearly shown upon Fig. 3 have a length substantially equal to the axial spacing of standards 7 and 8. The doors are shown as of equal size and so shaped, when in closed or firing position as to completely close and seal the upwardly-facing loading opening 12, Fig. 2, in tube 6 formed between standards 7 and 8. As shown upon Fig. 2, door 10 has aligned lugs 10a and 10b each bored to receive a pivot pin such as 13 with a press fit. Each pin is journaled in a base in an adjacent lug or thickened portion of tube 6, whereby the door may be swung from a loading position, shown in dotted lines upon Fig. 5, to a closed or firing position shown in solid lines. The other door 11 is similarly pivoted to tube 6 so that it is sufficient to identify its rearward lug 11b and pivot pin 14, Fig. 3. See also Fig. 5. From the latter figure it is noted that the pivot axes of the doors are positioned in the diametral horizontal plane of the tube and that each door has a total angular extent greater than 90°— about 120° in the model illustrated. By this construction, when the doors are simultaneously pivoted to the open or loading position, the lower portions thereof swing upwardly and jointly form a shelf or cradle for receiving a rocket indexed from the magazine, while, when in closed or firing position, the doors completely close the loading opening. From Fig. 5 it is noted that the lower, longitudinal edges of the doors are thinned, as at 10c to form when the doors are closed, a lap joint with a correspondingly and complementarily thinned portion of the tube. This construction provides a more effective gas seal between the edges of the doors and the tube, and, if desired, may be duplicated at and along the end edges of the doors. Also, it is contemplated that the meeting edges of the doors may be shaped to form an overlapped or interfitting joint to provide a more nearly gas-tight seal between them.

Referring to Figs. 2, 3, 7 and 8, in particular, it will be noted that door 10 has an operating and locking lug 15. This lug is positioned well below the axis of pivoted movement of the door, and has a cam surface 15a and an undercut portion 15b forming a locking projection. A lug, not shown, identical in construction, operation and location, is provided upon door 11.

As best shown on Figs. 2 and 3, left and right operating rods 16 and 17 are mounted for longitudinal reciprocation on and along tube 6 at the respective sides thereof.

For example, rod 16 has a sliding fit in aligned holes in lugs 19 and 20 secured to or formed integrally with tube 6. If desired, the rods may be non-circular, or any other means provided to prevent rotation and confine them to axial translation only. A spring 21 surrounds rod 16 and abuts lug 19 at its rearward end and a tab 22, fixed to rod 16, at its forward end. The rod is thereby constantly urged into forward motion.

Figure 7:
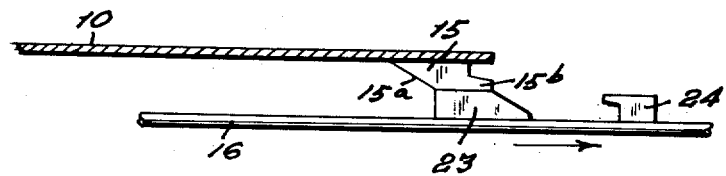
Fig. 7 is a detail view showing the positions of the slide and lower gate when the latter is in loading position.
Figure 8:
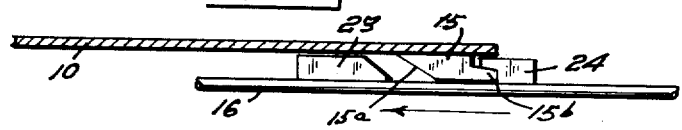
Fig. 8 is a view corresponding to Fig. 7 but showing the parts in locked or firing position.

Rod 16 has a forward camming projection 23 and a rearward locking projection both of which are in the same radial plane with lug 15; and it will be obvious from inspection of Figs. 7 and 8 that rearward motion of the rod from its forward or door-locking position shown upon Fig. 8 effects engagement of the cam surface 23 with that of lug 15 and causes a pivotal movement of door 10 from closed to open positions. Likewise, when the rod is in its most forward position the locking surfaces of parts 15b and 24 are in engagement to hold door 10 firmly closed. These surfaces are slightly inclined to the longitudinal axis of the rod, to thereby effect a firm camming of the door into closed position when the rod is in forwardmost position.

Rod 17 is mounted on tube 6 and spring-urged in a manner identical with that described for rod 16, and has like projections, only one of which, 25 appears upon Fig. 3. Also, door 11 has a lug identical with 15 so that the door is operated in an identical manner described for door 10.

Rods 16 and 17 are interconnected for simultaneous movement to thereby simultaneously operate the doors between loading and firing positions. For this purpose I have shown a shaft 26 journaled in the walls of tube 6 at the breech end thereof and extending substantially diametrically thereacross. A blast vane 27 is fixed to the shaft. The ends of shaft 26 project a short distance externally of the tube and each has a hub 28 and 29 secured thereto. Hub 28, for example carries an operating handle 30 and a short arm 31 whose end is connected with the adjacent end of rod 16 by a link 32. The other hub 29 has a handle 33, arm 34, and link, not shown, for connection with rod 17. By this construction, as shaft 26 is rotated counterclockwise as seen in Figs. 2 and 3, the doors 10 and 11 are first unlocked by rearward withdrawal of projections 24 and 25 and then pivoted to loading position by the operation of the camming projections. This rotation may be effected either manually by operation of handles 30 or 33, or automatically by blast vane 27 in response to the blast from the propelling charge of a rocket in the tube.

A second pair of doors or rocket support shelves 35 and 36 are used to index rockets from the magazine into the launcher tube 6. See Fig. 5. As shown, door 35 has a pair of aligned hinge pins 37 and 38 at its end edges, each of which is journaled in a corresponding hole in uprights 7 and 8 whereby the door may be swung from its position shown in solid lines, downwardly to its dotted line position. Door 36 is pivoted in an identical manner by trunnions, one of which is identified at 39, Fig. 5. These indexing doors, when in the solid-line position of Fig. 5, conjointly act to retain a rocket in position to be loaded into the launcher tube, and when simultaneously and oppositely pivoted to the dotted line positions, permit the rocket to fall into the tube or, more accurately, onto the cradle formed by the presently-open doors 10 and 11.

As one suitable mechanism for operating index doors 35 and 36 in timed relation with 10 and 11, I have shown them as provided at their forward ends with short operating arms 40 and 41 each fixed to the forwardly-projecting end of a corresponding hinge pin 37 and 39. A triple-arm lever 42, is pivoted to the front side of standard 7, as at 43 and its two oppositely-disposed arms are pivotally connected to the contiguous ends of links 44 and 45, respectively. The other end of link 44 is pivoted at 46 to the free end of index arm 40. Similarly, the other end of link 45 is pivoted to the free end of index arm 41. Thus, as lever 42 is pivoted, the doors 35 and 36 are correspondingly moved between open and closed positions.

For the purpose of pivoting doors 35 and 36 in timed relation with doors 10 and 11, the forward pivot pin of door 10 projects forwardly through standard 7 and has an arm 47 secured thereto. A link 48 connects arm 47 and the third arm of lever 42 and from inspection of Figs. 4 and 5, it will be clear that the doors are synchronously pivoted between open and closed positions whereby a rocket supported by and between doors 35 and 36 in closed position, is released to fall between the now-open doors 10 and 11 and rest upon the cradle portions thereof below pivot axes defined by pins 13 and 14, respectively. The weight of a rocket on the aforesaid cradle portions is sufficient to pivot them downwardly to closed position.

From Fig. 5 it is noted that index doors 35 and 36 each have a ridge 35a and 36a extending inwardly and upwardly from their pivot axes. These ridges or lugs are so positioned and dimensioned that they pivot inwardly to the dotted line positions shown to engage and hold the second rocket in the magazine from following the first rocket downwardly. The second rocket is thus prevented from moving downwardly onto the indexing doors until the latter have been pivoted to the full line position of Fig. 5 and is likewise prevented from interfering with closure of doors 10 and 11.

As is well known, an electrically fired rocket is provided with a metallic band about its tail assembly and which is insulated from the rocket casing. A lead extends from this band to the squib of the rocket and a second lead extends from the squib to the rocket casing which is grounded through the launcher when the rocket is in loaded position.

For the purpose of completing the firing circuit through the rocket to launch the same as well as to provide adequate safety, I have shown a contact button 49, Fig. 2 which is mounted for sliding radially of the launcher tube in a dielectric sleeve 50. As shown, the button is mounted in the lower portion of the tube and is urged upwardly by a coil spring 51 acting between the head of the button and the base of its mounting sleeve, fixed in bracket 52. A lead 53 extends from the button 49 to a micro-switch 54 which is of standard construction and has an operating plunger 55 in alignment with one of the operating rods, such as 16 for actuation thereby. Thus the switch is closed only when the rod is in the forwardmost position, shown upon Fig. 3, the vane 27 in operative position, and the doors locked. At all other times, namely when the rods have been partially or wholly retracted, the switch and the firing circuit included therein, are open.

A lead 56 extends from the other terminal of switch 54 to one terminal of a source of voltage 57. This source may be a small generator of well-known construction driven by a trigger 58 of the generator. The other terminal of the generator is grounded to the launcher through lead 59. Thus, the circuit through the firing squib of the rocket is closed and energizable only when (1) the rocket is properly loaded into the tube with its contact ring in engagement with button 49 and (2) rods 16 and 17 are in the forward position locking the doors 10 and 11 in which position vane 27 is vertical. Alternatively, it is contemplated that switch 54 may be so positioned that its plunger is operated to closed position directly by movement of one or both of the doors into fully closed, firing position.

The operation will be clear from the foregoing description and may be briefly summarized as follows. With one or more rockets positioned in magazine 9 depending upon its capacity, one of the two handles 30 or 33 is grasped and forced forwardly. This movement unlocks and opens the doors 10 and 11 from the full to dotted line positions shown upon Fig. 5. Simultaneously link 48 is operated by door 10, to move index doors 35 and 36 from the solid to dotted line positions. This movement of indexing doors 35 and 36 releases the lower-most rocket in the magazine and permits it to descend by gravity onto the cradle formed by the inwardly-extending portions of doors 10 and 11. As handle 30 or 33 is pivoted forwardly, the weight of the rocket upon doors 10 and 11 causes them to pivot to closed position wherein final movement of the lugs 24 and 25 cams the doors firmly shut to firing position. The final movement of rod 16 closes switch 54. The rocket may now be fired by a pull upon trigger 58, thus initiating the squib in the conventional manner. As the rocket is fired the blast from the propelling charge thereof impinges upon vane 27 and opens the doors to index the next rocket to firing position.

I have thereby provided a rocket launcher which is relatively simple to operate, of light weight, yet reliable in operation. The speed of firing is limited only by the rate at which rockets can be fed into the magazine. This feeding may be by hand in field installations, or automatically by means not shown. The doors must be fully closed and locked before a loaded rocket can be launched, while the firing of a rocket automatically indexes a succeeding rocket into the launcher tube.

As numerous changes will occur to those skilled in the art after a study of the foregoing disclosure, I desire that the same be taken in an illustrative rather than a limiting sense; and it is my desire and intention to reserve all modifications, alterations and substitutions within the scope of the subjoined claims.

Having now fully disclosed the invention, what I claim and desire to secure by Letters Patent is:

1. In a rocket launcher, a launcher tube having a cylindrical bore surface and an upwardly-facing loading opening in its breech end, a pair of standards fixed to said tube at the respective ends of said opening, a rocket magazine secured to said standards in superposed position over said opening, a pair of doors pivotable on said tube from a first position closing said opening to a second open position, a pair of rocket support shelves pivotable on said magazine from a first position supporting a rocket therein to a second position releasing the same for movement through the opening into said tube, first means releasably locking said pair of doors in closed firing position, second means operable to release said locking means and pivot said doors to open position, and means responsive to movement of said pair of doors between open and closed position to correspondingly operate said rocket support shelves to index a rocket from said magazine into said tube.

2. A repeating rocket launcher comprising a launcher tube having an upwardly-facing opening to permit a rocket to be loaded transversely downwardly thereinto, a magazine having an open bottom supported in fixed superposed relation over said opening, a pair of doors having straight side edges, means pivoting said doors on diametrically opposite sides of said tube for movement from a first position conjointly closing said opening to a second open position, a pair of rocket support shelves pivoted in said magazine for movement from a first position supporting a rocket therein, to a second position releasing the same for movement by gravity into said tube, and blast-operated vane means for synchronously pivoting said doors and shelves from first to second positions.

3. A rocket launcher comprising a launcher tube having a longitudinal axis and an upwardly-facing loading opening into its breech wall, said opening having straight side edges parallel with said axis and an angular extent about said axis greater than 180°, a pair of doors adapted conjointly to close said opening, means pivoting each door at a respective side of said opening on an axis parallel with said longitudinal axis, the axis of each door lying between its longitudinal edges, whereby the portions of said doors below their pivot axes move inwardly, to form a cradle above the bottom wall of the tube when the doors are pivoted from closed firing position to open loading position, a lug rigid with each door below its pivot axis, said lug having a camming surface and locking surface, first and second rods mounted for axial translation on said tube adjacent each lug, respectively, each said rod having a camming projection and a locking projection fixed in longitudinally-spaced relation thereon, said locking surface and projection interengaging to lock said doors in closed position in one limiting position of said rods, and means for simultaneously translating said rods to first separate said locking surfaces and projections and subsequently bring each said camming projection into engagement with its respective camming surface, to thereby pivot said doors to open loading position.

4. A launcher as recited in claim 3, a shaft journaled in said tube diametrally across the breech end thereof, a vane fixed to said shaft, and a link connection between each end of said shaft and a respective one of said rods.

5. A rocket launcher comprising, a launcher tube having an upwardly-facing opening in its breech end, a pair of doors adapted to conjointly close said opening, means pivotally mounting said doors on respective sides of said tube on respective axes parallel with the longitudinal axis of the tube for movement between an open position enabling a rocket to be loaded transversely through said opening into the tube, to a closed position forming a complete closure for said opening, the pivot axis of each said door lying between the longitudinal edges thereof whereby the lower portion of each door rises when the door is moved to open position to form with the lower portion of the other door, a rocket-receiving cradle above the bottom portion of said tube, said doors to close automatically by the weight of a rocket when in said cradle and a single manual means carried by said tube operable to simultaneously open and close said doors.

6. A rocket launcher comprising, a launcher tube having an upwardly-facing loading opening in its breech end of more than 180° angular extent about the axis of the tube, a pair of doors adapted to conjointly close said opening, pivot means mounting each door for pivotal movement about respective diametrically opposed axes parallel with the axis of the tube, the axis of each door lying between the longitudinal edges thereof whereby the lower portions of the doors rise in response to opening movement of the doors to form a rocket-receiving cradle above the bottom of the tube, locking lugs carried externally by each door below the pivot axis thereof, and means cooperating with said locking lugs for operating said doors movable from a first position engaging said lugs to lock the doors in closed position, to a second position camming said lugs toward each other to thereby open said doors into loading position.

7. A launcher as recited in claim 6, actuating mechanism for said door operating means comprising a shaft journaled to extend in and across the breech end of said tube, a vane fixed on said shaft in position to be operated by the blast from a rocket launched from said tube, said shaft being connected with said door operating means to move the latter from said first to said second position in response to launching of a rocket from said tube.

8. In a rocket launcher, a launcher tube having an upwardly-facing loading opening in its breech end, a pair of doors pivotally mounted in said opening, said doors adapted to conjointly close said opening and form with said tube a continuous cylindrical bore surface, each said door having a lug on its exterior surface, each lug including a camming surface and an undercut locking surface, a slide rod mounted for axial translation longitudinally of and adjacent each respective door, a locking lug and a camming lug on each slide rod, and means operable to simultaneously translate said rods from a first position wherein said locking lugs engage said undercut locking surfaces to lock said doors in closed position to a second position wherein said camming lugs engage said camming surfaces to simultaneously pivot said doors to open loading position.

9. In a rocket launcher, a launcher tube having an upwardly-facing loading opening in its breech end, a pair of doors pivotally mounted in said opening, said doors adapted to conjointly close said opening and form with said tube a continuous cylindrical bore surface, operating means for simultaneously open and close said doors, said operating means including a pair of rods each mounted for axial sliding between first and second positions longitudinally of said tube and adjacent a respective door, first and second projections fixed in axially spaced relation on each rod, said first projection interengaging with a respective lug to lock the corresponding door in closed position when said rod is in said first position, movement of said rod to said second position releasing said door and engaging said projection and lug to cam the doors to loading position, and a single means operable to move both of said rods from said first to said second position.

References Cited in the file of this patent

UNITED STATES PATENTS

| | | |
|---|---|---|
| 2,440,634 | Henney | Apr. 27, 1948 |
| 2,451,522 | Uhl et al. | Oct. 19, 1948 |
| 2,504,160 | Skinner et al. | Apr. 18, 1950 |
| 2,517,333 | Motley | Aug. 1, 1950 |
| 2,546,823 | Holloway | Mar. 27, 1951 |
| 2,587,672 | Whitson | Mar. 4, 1952 |

FOREIGN PATENTS

| | | |
|---|---|---|
| 636,422 | Great Britain | Apr. 26, 1950 |